United States Patent Office 3,542,720
Patented Nov. 24, 1970

3,542,720
COMPOSITIONS OF ANIONICALLY POLYMERIZED POLYCAPROLACTAM AND POLY(11-AMINOUNDECANOIC ACID)
John M. Kolyer, Convent, Albert A. Kveglis, Pine Brook, and Norman Sherman, Rockaway, N.J., assignors to Allied Chemical Corporation, New York, N.Y., a corporation of New York
No Drawing. Filed Sept. 4, 1968, Ser. No. 757,491
Int. Cl. C08g 41/04; C08k 1/40
U.S. Cl. 260—32.6                                   7 Claims

ABSTRACT OF THE DISCLOSURE

The impact strength of compositions of anionically polymerized polycaprolactam may be improved by carrying out the polymerization reaction in the presence of poly(11-aminoundecanoic acid).

BACKGROUND OF THE INVENTION

This invention relates to compositions of anionically polymerized polycaprolactam (nylon 6) having improved impact strength and to the method of preparing such compositions.

It is known that caprolactam may be polymerized, in the presence of a suitable anionic polymerization catalyst and a promoter, in situ in a mold to produce a shaped article. A particular application of this method of fabrication involves rotating the mold simultaneously about two axes to produce large, hollow objects of polycaprolactam. The technique of rotational molding is described in detail in U.S. Patent 3,275,733 to Schule et al.

The desirable physical properties of polycaprolactam, together with the facility with which large hollow objects of complex shape may be fabricated, make rotational molding especially suitable for producing such articles as gasoline tanks for automotive vehicles.

Gasoline tanks must be able to withstand the hazards to which they are subjected in normal use. One such hazard is the incidental impact of various objects, and since automotive vehicles are operated at temperatures below 0° C., it follows that the gasoline tanks of vehicles must be able to withstand such impact at such temperatures.

Polycaprolactam has excellent impact strength at about room temperature, but tends to be brittle at temperatures substantially below 0° C. It has been proposed to improve the impact strength of anionically polymerized polycaprolactam by adding certain monomeric compounds, especially N,N-disubstituted amides, such as N,N-dimethylbenzamide, to the polymerization reaction mixture. These monomeric compounds, which do not enter into the polymerization reaction, function as plasticizers in the resulting polymer. However, the plasticization effected tends to be only temporary because the compounds are eventually lost from the polymer by both evaporation and leaching.

The loss of plasticizers by evaporation and leaching is especially a problem in the case of automobile gasoline tanks because of their recurrent exposure to higher temperatures at which monomeric plasticizers are volatile, such as during the summer season, and their continual exposure to gasoline and water, which leach out the plasticizers.

In addition to providing only temporary plasticization, monomeric plasticizers have a further drawback in that they "dilute" the polymer and thereby reduce its tensile strength.

It is an object of this invention to prepare compositions of anionically polymerized polycaprolactam having permanently improved impact strength.

SUMMARY OF THE INVENTION

We have found that compositions of anionically polymerized polycaprolactam having permanently improved impact strength may be prepared by polymerizing, under substantially anhydrous conditions, caprolactam in the presence of an anionic polymerization catalyst, a promoter, and poly(11-aminoundecanoic acid), more commonly known as nylon 11.

The exact chemical structure of the composition thus prepared is uncertain. When subjected to differential thermal analysis, control samples of polycaprolactam and nylon 11 exhibited melting peaks at 218° C. and 185° C., respectively, and a composition prepared by polymerizing caprolactam anionically in the presence of 6.5 weight percent nylon 11 had a single melting peak, at 214° C., and no trace of a peak in the region of 185° C. This suggests that the composition is more than just a physical blend of nylon 11 and polycaprolactam, i.e., that there is chemical bonding between the two components. This is consistent with microphotographs of the composition, which reveal a homogeneous composition having spherulites which are more uniform in size than spherulites in the polycaprolactam control sample.

It is possible that the composition is a block copolymer of polycaprolactam and nylon 11, formed by the primary amino end group of the nylon 11 chain opening and adding to the terminal lactam ring of the polycaprolactam chain. It is also possible that the chemical bonding suggested by differential thermal analysis represents only hydrogen bonding between polymer chains. It is further possible for both types of bonding to be present. Hence, it is not possible to identify the exact chemical structure of the composition. However, the composition is believed to be novel and uniquely characterized by its physical properties and its method of preparation.

It was not predictable that nylon 11 would be so compatible with the anionically catalyzed polymerization reaction, which heretofore has only been used with lactams exclusively. In fact it is surprising that nylon 11 does not inhibit the reaction since acid functional groups are known to poison the anionic catalyst and nylon 11 has terminal carboxyl groups.

Except for the addition of nylon 11 to the reaction mixture, polymerization is conducted according to methods known to the art for the anionic polymerization of caprolactam alone. The reaction is carried out under substantially anhydrous conditions and at temperatures ranging from the melting point of caprolactam to the melting point of the resulting polymer. The anionic catalyst is normally a base which is strong enough to convert caprolactam to the corresponding iminium salt. The promoter is a compound which accelerates the reaction. Promoters for the anionic polymerization of lactams are the subject of numerous patents and their number is so great that it would not be feasible to catalogue them here, even by class. The catalyst and promoter used in the examples are representative and give good results. U.S. Patent 3,275,733, previously referred to, gives a particularly extensive list of suitable catalysts and promoters.

Nylon 11 can be used together with known monomeric plasticizers for anionically polymerized polycaprolactam to attain an even greater degree of impact strength, particularly at lower temperatures. The monomeric plasticizers which can be used include N,N-disubstituted amides having the formula

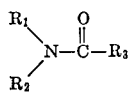

wherein $R_1$ and $R_2$ are independently selected from the group consisting of phenyl and alkyl radicals, and $R_3$ is selected from the group consisting of alkyl, phenylalkyl, phenyl, and alkylphenyl radicals, the alkyl groups having up to 5 carbon atoms. The above formula includes compounds wherein $R_3$ and $R_2$ together form a cyclic diradical, such as in N-methyl pyrrolidone. The monomeric plasticizers may be employed in an amount ranging from 2 to 20 weight percent based on caprolactam.

The composition of this invention has improved impact strength at room temperature and at elevated temperatures as well as at lower temperatures. It is because a particular need exists to improve impact strength at lower temperatures that this invention is described with particular reference thereto. Similarly, the fabrication of automobile gasoline tanks from the composition compounds the need for improved impact strength, but the improvement in impact strength which this invention provides is inherent in the composition itself and is independent of its application or the method by which it is molded.

DESCRIPTION OF THE PREFERRED EMBODIMENTS

The amount of nylon 11 which may be added to the reaction mixture is limited by the practical consideration of the viscosity which it imparts thereto. Mixtures containing more than about 8%, by weight based on caprolactam, of nylon 11 are generally too viscous for rotational molding and mixtures containing more than about 12% are too viscous to handle conveniently for even simple casting. However, the object of this invention, the improvement of impact strength, is attained satisfactorily at lower levels. Improvement in impact strength is noted at levels as low as 1%, and for most applications levels from 3 to 8% give particularly good results.

For optimum improvement in impact strength, nylon 11 can be used in similar proportions together with an N,N-disubstituted amide selected from the group consisting of N,N-dimethylbenzamide, N,N-dimethylacetamide and N-methylpyrrolidone, N,N-dimethylbenzamide gives particularly good results. The amide may be present in an amount from 2 to 20%, preferably 5 to 15%, by weight based on the caprolactam.

The following examples further illustrate the invention. All parts are by weight.

BASIC FORMULATION

The reaction mixture is prepared in two portions to facilitate handling and to prevent premature initiation of polymerization.

Mixture A.—To 100 parts of ε-caprolactam is added 0.12 part lithium hydride catalyst. The mixture is maintained under a nitrogen atmosphere at about 98° C.

Mixture B.—To 100 parts of ε-caprolactam is added .50 part triphenoxy-s-triazine promoter. The mixture is maintained under a nitrogen atmosphere at about 160° C.

EXAMPLE 1

In Mixture B was dissolved 15 parts poly(11-aminoundecanoic acid). Equal volumes of Mixtures A and B were then transferred to a mold cavity heated to about 165° C. After 30 minutes the casting was removed from the hot mold. The tensile properties and volatility (weight loss or gain on standing) of the composition are reported in Table I. The resistance of the composition to leaching by hot water and the impact strength of the composition, as determined by the following impact test, are reported in Table II.

IMPACT TEST

A 5 pound dart having a bullet nose (½ inch radius) is dropped from a height of 30.4 inches to produce a 152 in. lb. impact on a sample which measures ⅛ inch thick and 2⅛ inches square and which rests over a 1.5 inch diameter hole in a steel plate. A sample fails the test if it is fractured by the dart.

This test was devised to simulate the impact forces to which a cast, especially rotationally cast, anionically polymerized polycaprolactam article might be subjected in normal use.

EXAMPLE 2

The procedure of Example 1 was followed except 6.5 instead of 15 parts poly(11-aminoundecanoic acid) were dissolved in Mixture B. The resistance to leaching and impact strength of the composition thus produced are reported in Table II.

EXAMPLE 3

The procedure of Example 1 was followed except 14.9 parts poly(11-aminoundecanoic acid) were dissolved in Mixture B and in addition there was added thereto 34.3 parts N,N-dimethylbenzamide. The resistance to leaching and impact strength of the resulting composition are reported in Table II.

COMPARATIVE EXAMPLES

To compare the results obtained in the above examples with unmodified polycaprolactam, the procedure of Example 1 was followed except no poly(11-aminoundecanoic acid) was dissolved in Mixture B (Control A); and to compare the results with a composition plasticized with N,N-dimethylbenzamide (DMB) alone, the procedure of Example 1 was followed except 35.1 parts of N,N-dimethylbenzamide and no poly(11-aminoundecanoic acid) were dissolved in Mixture B (Control B). The tensile properties and volatility of the two comparative examples are reported in Table 1 and their resistance to leaching and impact strengths are reported in Table II.

With respect to the volatility test, the gain in weight by 5 of the 6 samples is due to absorption of moisture from the atmosphere, but the loss in weight by Control B reflects the amount of DMB lost to the atmosphere less the amount of water absorbed. Similarly, in the test for resistance to leaching, the loss in weight by all the samples is due in part to the extraction of monomer and oligomers from the polymer, but the extra weight loss in Example 3 and Control B reflects the loss of DMB from the sample.

TABLE I

| | Example 1 (6.5% Nylon 11) | Control A (unmodified) | Control B (13% DMB) |
|---|---|---|---|
| Ultimate tensile strength, p.s.i. | 9,484 | 13,578 | 7,441 |
| Yield strength, p.s.i. | 9,283 | 13,578 | 7,441 |
| Ultimate elongation, percent | 129 | 24 | 64 |
| Yield elongation, percent | 11 | 6 | 64 |
| Volatility at room temperature, percent change in weight after 94 days (315 days for Control A) | +.425 | +1.01 | +0.90 |
| Volatility at 63–66° C., percent change in weight after 94 days (315 days for Control A) | +0.011 | +0.045 | −3.4 |

TABLE II

| | Falling dart impact test, No. specimens passed/No. specimens tested | | | | | Resistance to leaching [1] |
|---|---|---|---|---|---|---|
| | 0° C. | −10° C. | −20° C. | −30° C. | −40° C. | |
| Control A (unmodified) | 1/3 | 2/4 | 1/4 | 0/4 | 0/4 | 4.8 |
| Example (6.5% Nylon 11) | 3/3 | 4/4 | 4/4 | 4/4 | 2/4 | 6.1 |
| Example 2 (3% Nylon 11) | ([2]) | 3/4 | 3/4 | 2/4 | ([2]) | 4.8 |
| Example 3 (5% Nylon 11, 11.5% DMB) | 3/3 | 4/4 | 4/4 | 4/4 | 4/4 | 11.1 |
| Control B (13% DMB) | 3/3 | 4/4 | 3/4 | 4/4 | 1/4 | 14.3 |

[1] Percent weight loss of samples boiled in water for 2 hours then dried at 150° C. and less than 1 p.s.i.a. for 2 hours.
[2] Not tested.

We claim:
1. A process for preparing compositions of anionically polymerized polycaprolactam having improved impact strength which comprises polymerizing, under substantially anhydrous conditions, caprolactam in the presence of an anionic polymerization catalyst, a promoter and poly(11-aminoundecanoic acid) wherein the amount of poly(11-aminoundecanoic acid) present in the reaction mixture ranges from 1 to 12% by weight based on the caprolactam.

2. The process of claim 1 wherein the amount of poly(11-aminoundecanoic acid) present in the reaction mixture ranges from 3 to 8% by weight based on the caprolactam.

3. The process of claim 1 wherein the reaction mixture also includes from 2 to 20%, by weight based on the caprolactam, of an N,N-disubstituted amide having the formula

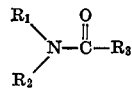

wherein $R_1$ and $R_2$ are independently selected from the group consisting of phenyl and alkyl radicals, and $R_3$ is selected from the group consisting of alkyl, phenylalkyl, phenyl and alkylphenyl radicals, the alkyl groups having up to 5 carbon atoms.

4. The process of claim 3 wherein the N,N-disubstituted amide is selected from the group consisting of N,N-dimethylbenzamide, N,N-dimethylacetamide and N-methylpyrrolidone.

5. The process of claim 3 wherein the tertiary amide is N,N-dimethylbenzamide.

6. The composition prepared in accordance with the process of claim 1.

7. The composition prepared in accordance with the process of claim 3.

References Cited

UNITED STATES PATENTS

| 3,206,418 | 9/1965 | Giberson | 260—857 |
| 3,410,833 | 11/1968 | Schaaf | 260—857 |

PAUL LIEBERMAN, Primary Examiner

U.S. Cl. X.R.

260—78, 857